United States Patent
Woxblom et al.

(10) Patent No.: US 9,538,234 B2
(45) Date of Patent: Jan. 3, 2017

(54) TIME-SHIFTING OF A LIVE MEDIA STREAM

(75) Inventors: Mikael Woxblom, Älvsjö (SE); Calin Curescu, Solna (SE); Olof Härwell, Stockholm (SE); Farjola Zaloshnja, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 814 days.

(21) Appl. No.: 13/515,111

(22) PCT Filed: Dec. 15, 2009

(86) PCT No.: PCT/SE2009/051424
§ 371 (c)(1),
(2), (4) Date: Jun. 21, 2012

(87) PCT Pub. No.: WO2011/075017
PCT Pub. Date: Jun. 23, 2011

(65) Prior Publication Data
US 2012/0265893 A1    Oct. 18, 2012

(51) Int. Cl.
*G06F 15/16* (2006.01)
*H04N 21/436* (2011.01)
(Continued)

(52) U.S. Cl.
CPC .... *H04N 21/43615* (2013.01); *H04L 12/2818* (2013.01); *H04L 12/2838* (2013.01);
(Continued)

(58) Field of Classification Search
CPC .......... H04L 29/06027; H04L 65/4076; H04L 65/4084; H04L 65/1006; H04L 65/1083; H04L 12/282; H04L 65/1059
(Continued)

(56) References Cited

U.S. PATENT DOCUMENTS

| | | |
|---|---|---|
| 6,990,512 B1 | 1/2006 | Major et al. |
| 7,020,081 B1 | 3/2006 | Tani et al. |

(Continued)

FOREIGN PATENT DOCUMENTS

| | | |
|---|---|---|
| CN | 1902934 A | 1/2007 |
| CN | 101129051 A | 2/2008 |

(Continued)

*Primary Examiner* — Brian J Gillis
*Assistant Examiner* — Shean Tokuta
(74) *Attorney, Agent, or Firm* — Murphy, Bilak & Homiller, PLLC

(57) ABSTRACT

A media muxer node (10) of a local network (7) is configured to time-shift a live media stream, by storing the stream on a local network storage (3) during a pause, and providing the stored and time-shifted stream to a local network-UE (5) after the pause. The pausing and the resuming of the media stream can be initiated from an external network-connected UE (1) outside the local network, or directly from the local network UE (7). The system also comprises a media aggregating node (2) for authentication of the external network—connected UE (1), which are both connected to a virtual control node (4). If a pause in the replay is discovered, the media muxer node (10) sees to the storage of the media in a local network storage (3) until the discovery of a restart command.

7 Claims, 11 Drawing Sheets

(51) Int. Cl.
*H04L 12/28* (2006.01)
*H04N 21/2187* (2011.01)
*H04N 21/433* (2011.01)
*H04N 21/6587* (2011.01)
*H04L 29/06* (2006.01)

(52) U.S. Cl.
CPC ...... *H04L 65/1046* (2013.01); *H04L 65/4092* (2013.01); *H04N 21/2187* (2013.01); *H04N 21/4333* (2013.01); *H04N 21/6587* (2013.01); *H04L 2012/2849* (2013.01)

(58) Field of Classification Search
USPC ............... 709/231, 217, 220, 227, 203, 219, 224,709/218, 225, 226, 230, 201, 202, 206, 212,709/223, 228, 232, 249; 370/328, 429, 503, 370/208, 210, 241, 252, 254, 278, 312, 322, 370/326, 327, 329, 332, 338, 339, 342, 344, 370/348, 349, 353, 392, 437, 442, 465, 474, 370/498, 509, 514, 517, 522
See application file for complete search history.

(56) References Cited

U.S. PATENT DOCUMENTS

| | | | |
|---|---|---|---|
| 2003/0018753 A1* | 1/2003 | Seki | 709/219 |
| 2003/0217136 A1* | 11/2003 | Cho et al. | 709/223 |
| 2005/0216949 A1* | 9/2005 | Candelora et al. | 725/134 |
| 2006/0248557 A1* | 11/2006 | Stark et al. | 725/37 |
| 2007/0011343 A1* | 1/2007 | Davis | H04L 29/06027 709/231 |
| 2007/0079345 A1* | 4/2007 | McEnroe | 725/106 |
| 2007/0083910 A1* | 4/2007 | Haneef et al. | 725/135 |
| 2007/0101012 A1* | 5/2007 | Li et al. | 709/231 |
| 2007/0106762 A1* | 5/2007 | Kim et al. | 709/219 |
| 2007/0136778 A1* | 6/2007 | Birger et al. | 725/117 |
| 2007/0157220 A1* | 7/2007 | Cordray et al. | 725/9 |
| 2007/0180068 A1* | 8/2007 | Haeuser et al. | 709/220 |
| 2007/0263980 A1* | 11/2007 | Chen et al. | 386/68 |
| 2008/0010482 A1* | 1/2008 | Tsang | 714/2 |
| 2008/0026725 A1* | 1/2008 | Cha | 455/411 |
| 2008/0120422 A1* | 5/2008 | Park et al. | 709/229 |
| 2008/0160938 A1* | 7/2008 | Hwang et al. | 455/132 |
| 2009/0018679 A1* | 1/2009 | Pina | 700/94 |
| 2009/0044242 A1 | 2/2009 | Ramakrishnan et al. | |
| 2009/0070840 A1* | 3/2009 | Kamimaki et al. | 725/114 |
| 2009/0228936 A1* | 9/2009 | Davis et al. | 725/80 |
| 2009/0268754 A1* | 10/2009 | Palm et al. | 370/466 |
| 2009/0320033 A1* | 12/2009 | Gokhale et al. | 718/103 |
| 2010/0095332 A1* | 4/2010 | Gran et al. | 725/93 |

FOREIGN PATENT DOCUMENTS

| | | | |
|---|---|---|---|
| EP | 2034730 A1 | 3/2009 | |
| JP | 2001216731 A | 8/2001 | |
| JP | 2002335479 A | 11/2002 | |
| JP | 2005253017 A | 9/2005 | |
| JP | 2007318786 A | 12/2007 | |
| JP | 2009010912 A | 1/2009 | |
| JP | 2009081730 A | 4/2009 | |
| JP | 2009171597 A | 7/2009 | |
| JP | 2009246815 A | 10/2009 | |
| WO | 2007080632 A1 | 7/2007 | |
| WO | WO 2007101473 A1 * | 9/2007 | H04N 5/00 |

* cited by examiner

TIME-SHIFTING OF A LIVE MEDIA STREAM

TECHNICAL FIELD

The present invention relates to a method for a media aggregating node, for a media muxer node of a local network, and for an external network-connected UE, of time-shifting a live media stream playing on a local network-UE, as well as to the media aggregating node, the media muxer node, and the external network-connectable UE.

BACKGROUND

A local network, e.g. a home network or an office network, may comprise several inter-connected consumer electronic devices, e.g. personal computers, mobile phones, set-top-boxes and gaming consoles. Electronic devices within a local network can be adapted to communicate with each other e.g. according to DLNA (Digital Living Network Alliance) standard, which allows electronic devices to communicate and share media content with each other, thereby enabling e.g. access of media files residing e.g. on a PC directly on a TV within the e.g. a DLNA home network, without a complicated configuration process.

A DLNA-compatible device is able to communicate with other DLNA-compatible devices within the DLNA network via the Universal Plug and Play (UPnP), which is a network protocol that is capable of establishing communication between DLNA-compatible devices within a DLNA network, without any configuration. By means of the UPnP, a DLNA device is able to e.g. discover and address other available DLNA devices within a DLNA network, and receive a description of their capabilities.

The DLNA-compatible devices within a DLNA network are typically of different types, based on their function in the media distribution and rendering, and the types involve a DMS (Digital Media Storage/Server), a DMP (Digital Media Player), a DMR (Digital Media Renderer), and a DMC (Digital Media Controller). A DMS may be e.g. a PC (Personal Computer) or a NAS (Network Attached Storage), and it is a device that stores media content and makes it available to a wired and/or wireless networked DMP or DMR. A DMP may be e.g. a TV, a stereo, a game console or a mobile phone, and it is a device that is able to find content on a DMS, and provide playback and rendering capabilities. Further, a DMC is a device that locates content on a DMS and plays it on a DMR, and a DMC may be e.g. a PDA (Personal Digital Assistant) or a mobile phone. Finally, a DMR is a device that plays content received from a DMC, and a DMR may be e.g. a TV, an audio/video receiver, a video display or remote speakers.

FIG. 1 illustrates a conventional DLNA network comprising four DLNA compatible devices, i.e. a DMP 5a, a DMR 5b, a DMS 5c and a DMC 5d. The DMC (Digital Media Controller) 5d is able to obtain a file structure from the DMS, and send a specific URL to the DMR, the URL received from the DMS file structure. The DMR 5b is able to connect to the specified URL, which in this case is the DMS 5c itself. Further, the DMP 5d is also able to obtain a file structure from the DMS, and play a link given in the DMS file structure.

An end-user may want to pause a live media session, e.g. for answering the phone, and then resume the watching of the media session after the phone call. Therefore, it would be advantageous to enable a time-shifting of live media content playing on a local network-device, e.g. in a DLNA network. However, a time-shifting of the live media stream is not possible on a local network-device that is not provided with a hard-drive, such as on a DMR (Digital Media Renderer), e.g. a TV. In order to pause the streaming of a live media session, and resume the streaming of the media session at the same position, a DLNA-device, e.g. a DMR, has to query the status from the media server before pausing the streaming, and perform a seek-command in order to resume the playing of the stream. However, even if a media server would support this functionality, a synchronization gap would exist between the instance when the seek-command was read by the media server, and when the streaming was really paused. Moreover, there is no way to stop an inline-frame in the media stream, so the media content will appear garbled for a while after resuming the play-out.

Thus, it still presents a problem to enable a time-shifting of a live media stream playing on a local network-device, e.g. on a DLNA-compatible device of a DLNA network.

SUMMARY

An object of the present invention is to address the problems and disadvantages outlined above, and this object and others are achieved by the method and the arrangement according to the appended independent claims, and by the embodiments according to the dependent claims.

According to one aspect, the invention provides a method for a media muxer node of a local network of time-shifting a live media stream playing on a local-network UE. The playing is initiated by an external network-connected UE located outside the local network and communicating with a media aggregating node, and a user has to be logged-in both to the external network-connected UE and to a virtual control node of the local network. The virtual control node and the media muxer node are both connected to the media aggregating node, and the media muxer node is further connected to a media streaming server for providing a media stream to the local network-UE, as well as to a local network-storage. The method comprises at least the following steps, performed by media muxer node:

Discovering a pause of the media stream to the local network UE;
Storing the media stream in an available local network-storage;
Discovering a restart of the media stream to the local network;
Providing a time-shifted media stream from the local network storage to the local network-UE.

The media muxer node may further provide the live media stream to the local network-UE, if the time-shifted media stream catches-up the live media stream.

The media muxer node may determine if a local network-storage is available for storage of a media stream.

The media muxer node may have performed the following steps, before the above steps:

Received a playlist from the media aggregating node; and
Retrieved the media stream from a media streaming server, and provided to the local network-UE.

The time-shifted media stream may be played at a user-selectable speed, and the pausing, as well as the playing of the live media stream, may be initiated by the external network-connected UE or by the local network-UE.

According to a second aspect, the invention provides a method for a media aggregating node of time-shifting a live media stream playing on a local-network UE, the playing initiated by an external network-connected UE located outside the local network and communicating with the media aggregating node. The local network further comprises a media muxer node and a virtual control node connected to the media aggregating node. The media muxer node is further connected to a media streaming server for providing a media stream to the local network-UE, as well as to a local network-storage, and a user has to be logged-in both to the external network-connected UE and to the virtual control node. The media aggregating node performs at least one of the following steps:

Receiving a pause command from the external network-connected UE for the live media stream, and forwarding a command to the local network-UE, via the virtual control node, to pause the playing of the live media stream received from the media muxer node, the media muxer node storing the live media stream in an available local network-storage;

Receiving a resume play-command from the external network-connected UE for the live media stream, and forwarding a command to the local network UE, via the virtual control node, to resume the playing of the media stream received from the media muxer node, the media muxer node providing the time-shifted media stream stored in the local network-storage to the local network-UE.

The media aggregating node may have performed the following steps, before the above steps:

Received a command from the external network-connected UE to play a user-selected live media content on a user-selected local network-UE;

Sent a command to the virtual control node of the local network to play the media content on the local network-UE as a live media stream received from the media muxer node; and Sent a playlist to the media muxer node.

According to a third aspect, the invention provides a method for an external network-connected UE of time-shifting a live media stream playing on a local-network UE from the outside of the local network by communicating with a media aggregating node.

The playing is initiated by the external network-connected UE, and the local network further comprises a media muxer node and a virtual control node, both connected to the media aggregating node, and the media muxer node is further connected to a media streaming server for providing a media stream to the local network-UE, as well as to a local network-storage. A user has to be logged-in to both the external network-connected UE and to the virtual control node, and the external network-connected UE performs at least one of the following steps:

Sending a pause command to the media aggregating node for the playing of the live media stream, the command to be forwarded to the local network UE via the virtual control node, the media muxer node storing the live media stream in an available local network-storage;

Sending a resume play-command to the media aggregating node to resume the playing of the live media stream, the command to be forwarded to the local network UE via the virtual control node, the media muxer providing the time-shifted media stream stored in the local network-storage to the local network-UE.

The external network-connected UE may have performed the following steps, before the above steps:

Sent a command to the media aggregating node to play a user-selected live media content on a user-selected local network-UE, the play command forwarded to a local network-UE via the virtual control node.

The external network-connected UE may further perform the additional steps of:

Sending a message to the media aggregating node indicating a user-selected speed of the playing of the time-shifted media, to be forwarded to the local network UE via the virtual control node.

According to a fourth aspect, the invention provides a media muxer node for a local network, arranged to time-shift a media stream playing on a local-network UE. The playing is initiated by an external network-connected UE located outside the local network and communicating with a media aggregating node, and the media muxer is connectable to a media streaming server for providing a media stream to the local network-UE, as well as to a local network-storage. A user has to be logged-in to both the external network-connected UE and to a virtual control node of the local network, and the media muxer node and the virtual control node are both connectable to the media aggregating node. The media muxer node comprises:

A device for communicating with local network UEs, and the device is arranged to:

Discover a pause of the live media stream to the local network UE;

Store the media stream in an available local network-storage; Discover a restart of the media stream to the local network UE; Provide the time-shifted media stream from the local network-storage to the local network-UE.

According to a fifth aspect, the invention provides a media aggregating node arranged to time-shift a media stream playing on a local-network UE, and the playing is initiated by an external network-connected UE located outside the local network and communicating with the media aggregating node. A media muxer node of the local network is connectable to a media streaming server for providing a media stream to the local network-UE, as well as to a local network-storage, and a user has to be logged-in to both the external network-connected UE and to a virtual control node of the local network. The media muxer node and the virtual control node are both connectable to the media aggregating node, which comprises:

A device for communicating with the external network-connected UE, and the device is arranged to:

Receive a command to pause the playing of the live media stream;

Receive a command to resume the playing of the live media stream;

A device for communicating with the virtual control node, and the device is arranged to:

Forward a command to pause the playing of the media stream from the media muxer on the local network-UE, the media muxer node storing the media stream in an available local network-storage;

Forward a command to resume the playing of the media stream from the media muxer node on the local network-UE, the media muxer node providing the time-shifted media stream stored in the local network-storage.

The device for communicating with the external network-connected UE may be further arranged to receive a command to play user-selected live media content on a user-selected local network UE, the device for communicating with the virtual control node may be further arranged to send a command to play the live media content on the local network-UE as a live media stream to be received by the local network-UE from the media muxer node, and the device for communicating with the media muxer node may be arranged to forward a playlist.

The media aggregating node may be further arranged to receive a message from the external network-connected UE indicating a user-selected speed for the playing of the time-shifted media stream, to be forwarded to the virtual control node.

According to a sixth aspect, the invention provides an external network-connectable UE arranged to time-shift a media stream playing on a local-network UE from the outside of the local network by communicating with a media aggregating node. The playing is initiated by the external network-connectable UE, and a media muxer node of the local network is connectable to a media streaming server for providing a media stream to the local network UE, as well as to a local network-storage. A user has to be logged-in both to the external network-connected UE and to a virtual control node of the local network, and the media muxer node and the virtual control node are both connectable to the media aggregating node, the external network-connectable UE comprising:

A device for communicating with a media aggregating node, the device arranged to:

Send a command to pause the playing of the live media stream, the command to be forwarded to the local network UE via the virtual control node, the media muxer node storing the media stream in an available local network-storage;

Send a command to resume the playing of the media stream, the command to be forwarded to the local network UE via the virtual control node, the media muxer node providing the time-shifted media stream stored in the local network-storage to the local network-UE.

The device for communicating with a media aggregating node may be further arranged to send a command to play a user-selected live media content on a user-selected local network-UE, to be forwarded to the virtual control node, and to send a message indicating a user-selected speed of the playing of the time-shifted media stream.

The external network-connectable UE may further comprise a display for displaying received information, as well as suitable user input means.

The local network may be a DLNA-network and the local network-UEs DLNA-compatible, and the external network may be the Internet.

An advantage with the present invention is that it allows an end-user to pause a live media stream playing on a local network-device, and to resume playing a time-shifted media stream at the same position. Optionally, the invention further enables a catch-up of the live media stream after the pause in order to provide synchronization with the EPG (Electronic Program Guide)

BRIEF DESCRIPTION OF THE DRAWINGS

The present invention will now be described in more detail, and with reference to the accompanying drawings, in which.

DETAILED DESCRIPTION

Figure 1:
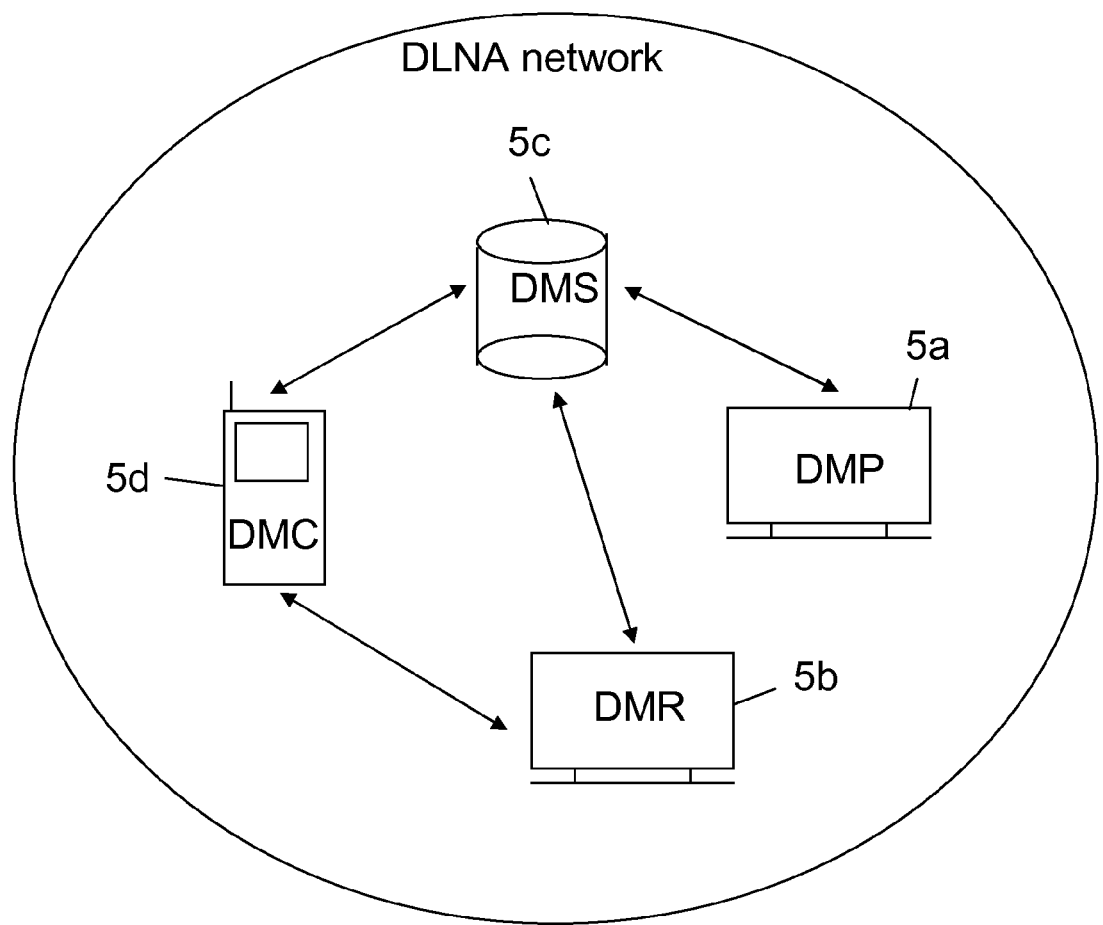
FIG. 1 schematically illustrates a conventional DLNA network.

In the following description, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it is apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

In the following, the term local network-UE (User Equipment) is defined as a device that is capable of operating in a local network and communicating with the other devices in the local network, e.g. in a DLNA network. The term external network is defined as another network than the local network, and the term external network-connectable UE or external network-connected UE is defined as a device that is capable of communicating with this external network. According to a preferred embodiment of the invention, the external network corresponds to the Internet, but this invention is not limited thereto.

Conventionally, a DLNA network comprises one or more DMS (Digital Media Storage/Server) for storing media content, and the available media content can be presented to a user on a DMC (Digital Media Controller), typically in the form of tree structure. Thereafter, a user-selected media content, such as video- or audio-media or an image, can be made available by the user to be played or rendered on a DMP (Digital Media Player) or on a DMR (Digital Media Renderer).

However, according to this invention, an external-network-connectable UE (User Equipment), such as e.g. an Internet-enabled mobile phone or a PC, is used for controlling and navigating media content, e.g. hosted on the Internet, within the local network (e.g. a DLNA network) via a media aggregating node, for pushing the media content directly to a first local network-compatible UE, e.g. to a DLNA-compatible PC, TV or radio, via a virtual control node of the local network. The end-user logs in to an external network-connectable UE and starts playing a selected external network-media session on a device of a local network, to which the user, or an associated user, is logged-in via a virtual control node of the local network, by attaching the UE to a media aggregating node, and sending a play command selecting said device and the media session to play. The media aggregating node authenticates the end-user and checks that he/she is also logged in to the local network, and forwards the play-command to the device in the local network via the virtual control node.

Said media aggregating node is responsible e.g. for authenticating a user logged-in to the UE and a user logged in to the virtual control node of the local network, and the virtual control node controls and communicates with the local network-compatible devices of the local network, e.g. using the UPnP. The external network-connectable UE communicates with the media aggregating node, which, in turn, communicates with the virtual control node of the local network. Thereby, the external network-connectable UE is able to function as a custom-optimized navigation client, without the restrictions imposed e.g. by the DLNA and the UPnP. Further, external network-media content can be streamed on-demand to the local network-UEs, and do not have to be downloaded locally prior to playing.

Media content, as well as advertisements, could be hosted anywhere on external networks, e.g. on the Internet. In order to time-shift a live media stream provided by a media streaming server, e.g. for enabling the user to pause a live media session, or for inserting advertisements into the live media stream, a media muxer node of the local network communicates with the media aggregating node for receiving a playlist of information, e.g. URLs, indicating where to find the media content. The media muxer node will retrieve the media stream from a media streaming server, and provide to the local network-device. In order to time-shift the live media stream, according to this invention, the media muxer node will identify if an available DMS (Digital Media Server/Storage) is present in the local network. If so, the media muxer node will store the media stream temporarily in the DMS. Then, when the playing of the media stream is resumed, the media muxer fetches the media content stored in the DMS, and provides the content as a time-shifted media stream to the local network-device, e.g. to a DMR.

If the speed of the playback of the time-shifted media content is increased only slightly, e.g. by 5%, the increase will not be noticeable, but will still allow a catch-up of the live media stream, such that the media muxer eventually will be able to provide the media stream to the local network-UE directly from the media streaming server. Preferably, the speed is selectable by the user, and enabling the user to synchronize the media content with the timing of the EPG.

The user could pause and resume the playing of the live media stream via an external network-connected UE, or directly via the DMR.

In an exemplary use-case according to an embodiment of the present invention, according to which the local network is a DLNA network and the external network is the Internet, an end-user logs in to an Internet-connected UE, e.g. to a mobile phone or a PC. Thereafter, the user requests the media aggregating node to send information regarding e.g. available and popular television news programs from a pre-selected Internet-media content provider, as well as regarding available and suitable DLNA-compatible devices. In response, the end-user receives a list comprising short descriptions, thumbnails and various additional metadata in return, provided by the Internet-media content provider via the content data-node and the media aggregating node, as well as a list of available and suitable devices within the available DLNA networks. The end-user selects e.g. a DLNA-compatible TV located in the living room, and sends a play command to the media aggregating node indicating the selected news program and the selected TV in the living room.

The media aggregating node forwards the play command via the virtual control node, the command also indicating that the media stream shall be provided to the selected TV by a media muxer node of the local network. The media muxer node will receive a playlist from the media aggregating node containing URLs for the user-selected media content, and create a stream by retrieving the media content from a streaming server, to be forwarded to the selected living-room TV.

If, and when, the end-user wishes to pause the playing of the live media content, e.g. for answering the phone, he inputs a pause command on the Internet connected UE, or directly on the DLNA-compatible TV, in order to freeze the picture on the TV-display. When the media muxer node discovers the pause in the media stream to the TV, the media muxer node will determine if any available storage device is present within the local network. If so, the media muxer node will store the live media stream in the storage device. Later, when the end-user wishes to resume watching the media content, he/she inputs a resume play-command on the Internet connected UE, or directly on the TV.

When the media muxer node discovers that the media stream is about to be restarted, it will provide the stored media stream to the TV as a time-shifted media stream, instead of the live media stream. Thereby, the end-user is able to resume watching the media content without having missed anything. Optionally, the end-user is able to play the time-shifted media stream with a selectable higher speed, in order to catch-up the live media stream.

Thus, a preferred embodiment of the invention is implemented by means of a media aggregating node (MA), a media muxer node (MUX), and of an external network-connectable UE, e.g. an Internet-connectable UE (IC UE), which are described below:

The media aggregating node is connected to a content database, which is able to send URLs to the media aggregating node, to be forwarded in a playlist to a media muxer node, and the playlist could also include advertisements. The media aggregating node is further able to communicate with the external network-connected UE, and with the virtual control nodes of one or more local networks, e.g. DLNA networks.

The media muxer node of the local network receives information, e.g. URLs, from the media aggregating node to enable the media muxer node to retrieve user-selected media content from the media streaming server, and advertisements from an advertisement server, which could be streaming server. This information could be pushed by the media aggregating node, or sent on request. Thereafter, the media muxer node creates a stream to be provided to a user-selected local network-compatible device.

Thus, the media muxer node is able to communicate with the media aggregating node, with the media streaming servers, with the advertisement servers, as well as with the local network-compatible devices of the local network, e.g. a DLNA network.

An external network-connectable UE, e.g. a PC or a mobile phone, is capable of displaying available external network-media content and available and suitable local network-compatible UEs within the local network to a user, thereby enabling the user to select an external network-media content and an available local network-compatible UE, and send a control command, e.g. to start playing the selected media content on the selected local network-UE within the local network, and to pause and resume the playing of the media content. The external network-connectable UE is able to communicate with a media aggregating node.

Other nodes that are involved in the implementation of the present invention are the following:

A virtual control-node is located within a local network and acts e.g. as a DMC (Digital Media Controller) in a DLNA network for communicating presence and control messages to the local network-compatible UEs within the local network. The virtual control node is able to communicate with the UEs within the local network, e.g. according to the UPnP, and with the media aggregating node. According to an exemplary implementation, the virtual control node communicates with the media aggregating node via a Home Gateway, and could be co-located with the Home Gateway node.

A content data-node owned by the Internet-media content providers, for publishing the available media titles and their respective URL's, by communicating with the media aggregating node.

A streaming server-node from which the media muxer node retrieves the media stream, and provides it to the local network-UEs.

Figure 2:
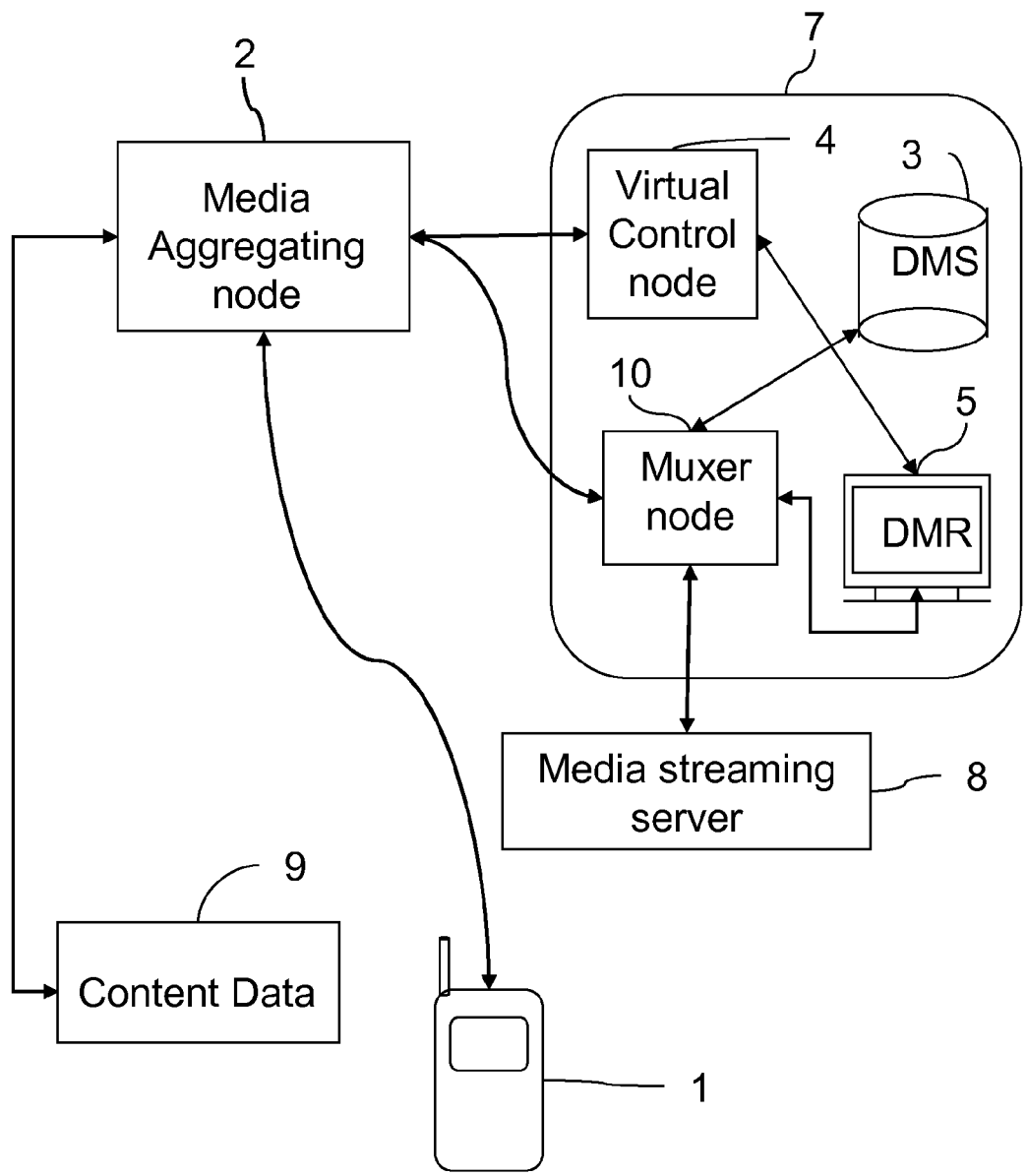
FIG. 2 is a block diagram schematically illustrating a local network, in particular a DLNA network, comprising a virtual control node and a media muxer node, which both are connected to a media aggregating node, and an external network-connected UE communicating with the media aggregating node, according to an exemplary embodiment of the invention.

The above-described nodes are all illustrated in FIG. 2, which is a block diagram schematically illustrating an exemplary DLNA network 7 comprising a virtual control node 4 and a DLNA-compatible UE 5, e.g. a DMR (Digital Media Renderer). The virtual control node is communicating with a media aggregating node 2, e.g. via a Home Gateway (not illustrated in the figure), and the media aggregating node is communicating with an Internet-connected UE 1 outside the DLNA network, and enabling the UE to control Internet media-content in the DMRs within the DLNA, the stream provided to the DMR 5 by a media muxer-node 10. The media muxer-node obtains the media stream from the media streaming server 8, and creates the stream to be provided to the DMR, or to the DMS 3 (Digital Media Storage/Server), for storing the media stream during a pause. The media aggregating node is further able to communicate with a Content data-node 9 in order to obtain available media titles and their respective URLs, to be forwarded in a playlist to the media muxer node, either pushed to the media muxer node, or sent in response to a request.

Figure 3A:
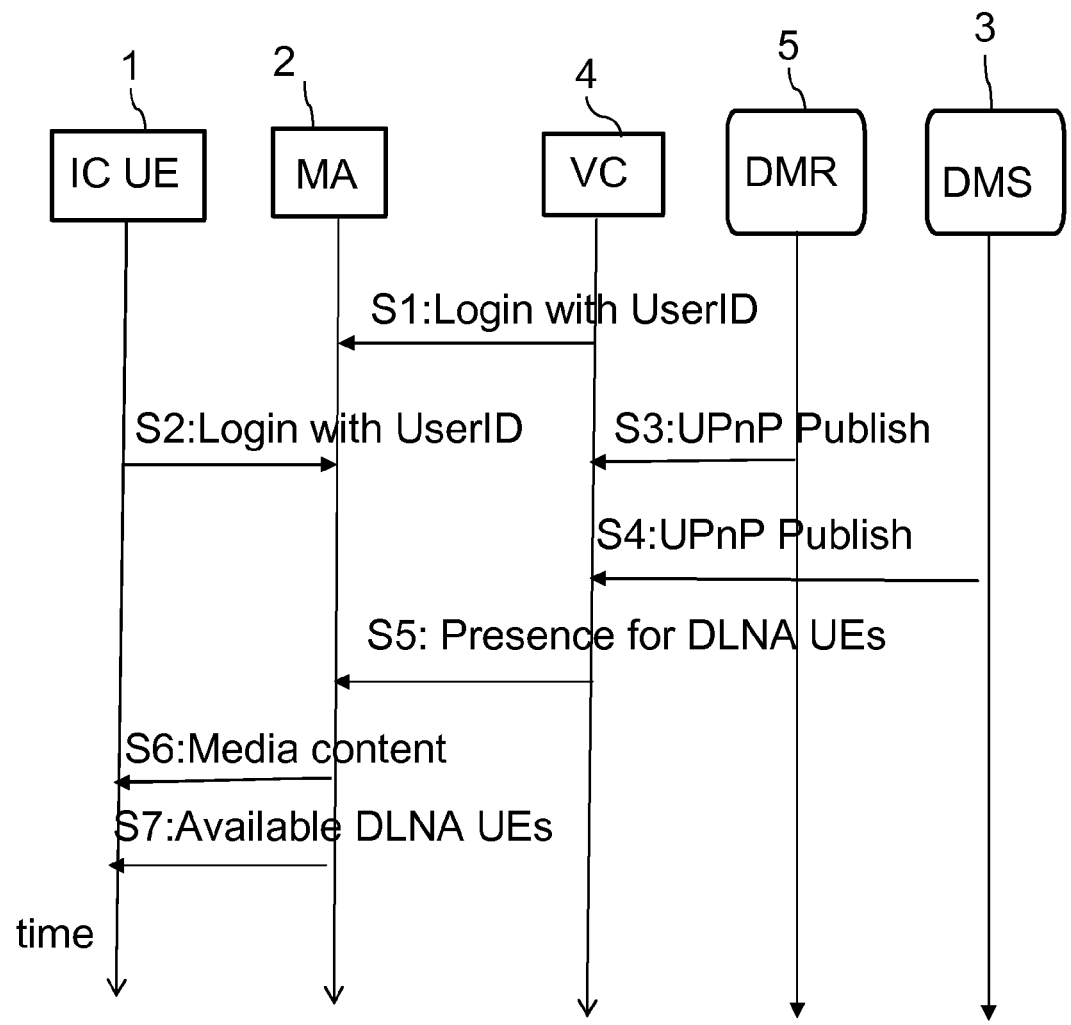
FIG. 3a is an exemplary signalling diagram illustrating how an Internet-connected UE logs in to a media aggregating node, enabling the UE to control Internet-media content on a DLNA-compatible device within a DLNA network.

FIG. 3a is an exemplary signalling diagram illustrating how an Internet-connected UE 1 logs in to a media aggregating node 2, enabling the IC UE 1 to control Internet-media content on the DLNA-compatible devices within a DLNA network, according to an exemplary embodiment of the invention. In signal S2, the IC-UE 1 logs in to the MA 2 (media aggregating node) by sending user name and password, and the MA determines that the user has previously logged-in to the virtual control node 4, which forwarded the user name and password to the MA in signal S1.

In signals S3 and S4, the DMR 5 and the DMS 3, respectively, sends a UPnP Publish to the VC 4 comprising presence information, e.g. that they are available. The VC, in turn, forwards the presence information to the MA, in signal S5. In signal S6, the MA sends information regarding Internet media content to the IC UE, and the Internet media content-information has been obtained by the MA from a content-provider via a content data-node (not illustrated in the diagram). Further, in signal S7, the MA sends information regarding available and suitable DLNA UEs to the IC UE. Thereafter, using the information received in signals S6 and S7, the user is able to select Internet media content and a DLNA UE, and send a play command to the MA, to be forwarded to the DLNA UE via the VC.

Thus, the media aggregating node 2 receives status and presence information from the local network-UEs of the local network via the virtual control node 4. When a user logs in to an external network-connected UE 1 outside the local network, the media aggregating node receives user login information from the external network-connected UE. The media aggregating node authenticates the user, and sends information regarding external network-media to the external network-connected UE, in response to a request. Further, it determines whether or not the user, or an associated user, is also logged in to a virtual control node, with which the media aggregating node is communicating. If so, the media aggregating node will send information regarding available and suitable local network-UEs to the external network-connected UE, typically in response to a request. When the media aggregating node receives a user-selected control command associated with a selected external network-media and a selected local network-UE from the external network-connected UE, it will forward the control command to the virtual control node.

Figure 3B:
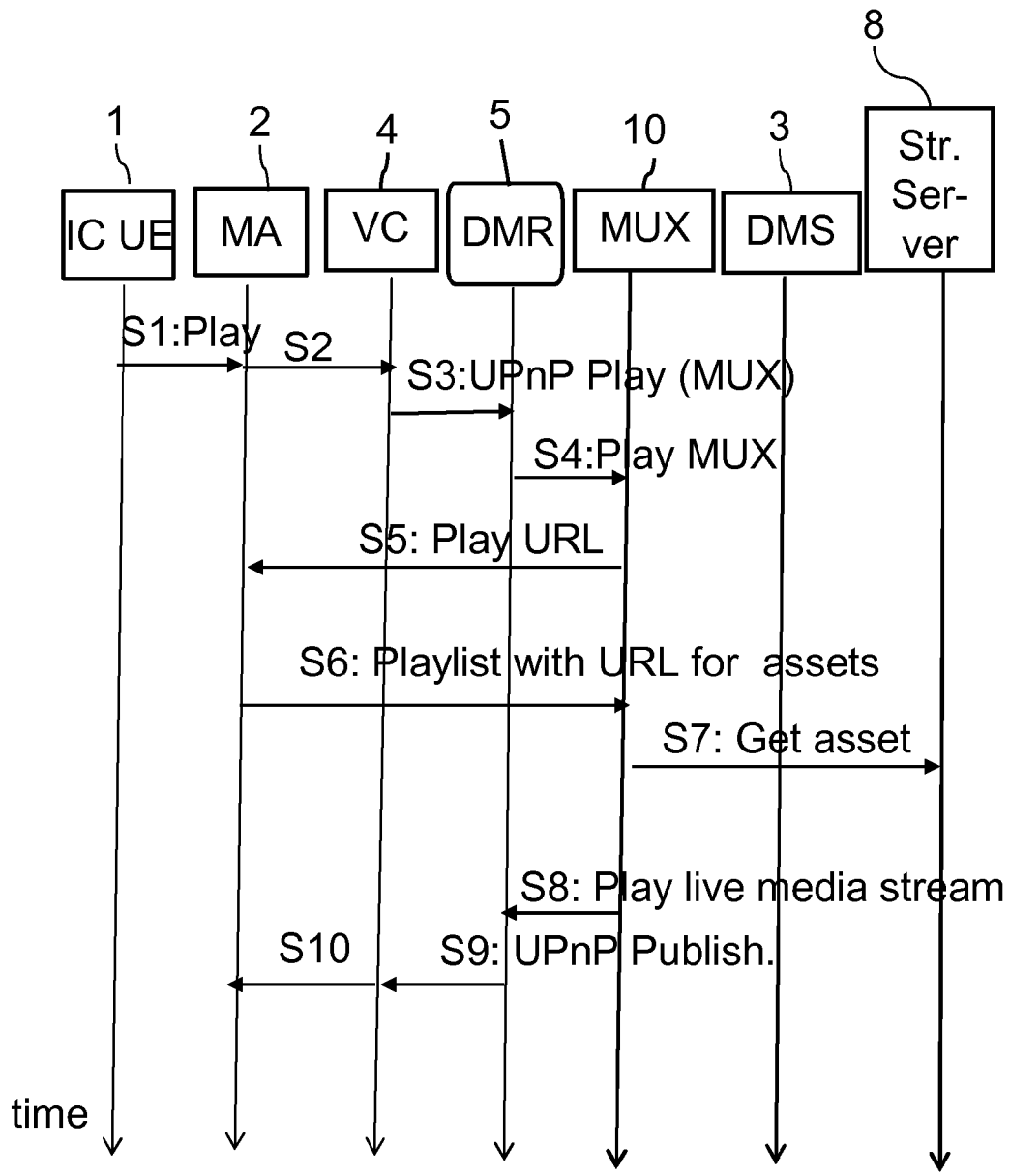
FIG. 3b is an exemplary signalling diagram illustrating the play-out of media content on a DMR from a media muxer node of the DLNA network.

FIG. 3b is an exemplary signalling diagram illustrating an IC UE initiating the playing of a live media stream on a DMR within the DLNA network. In signal S1, the end-user sends a command to the MA, using the IC UE, to play a certain live media session on a selected DMR 5, and the MA forwards the play command to the VC, in signal S2. Next, the VC forwards the play command, in signal S3, as a corresponding UPnP Play command to the DMR, the command further indicating that the live media stream shall be provided by a media muxer node 10 of the local network. Accordingly, the DMR requests a stream from the media muxer, in signal S4, and the media muxer sends a request for a playlist to the MA, in signal S5. The MA forwards a playlist comprising the URLs of the user-selected media content, and possibly also of advertisements, to the media muxer, in signal S6.

Next, the media muxer node retrieves a live media stream from the streaming server 8, in signal S7, and provides to the DMR in signal S8. The DMR issues a UPnP publish, in signal S9, that the media content is being played, which is forwarded to the MA in signal S10.

Figure 4A:
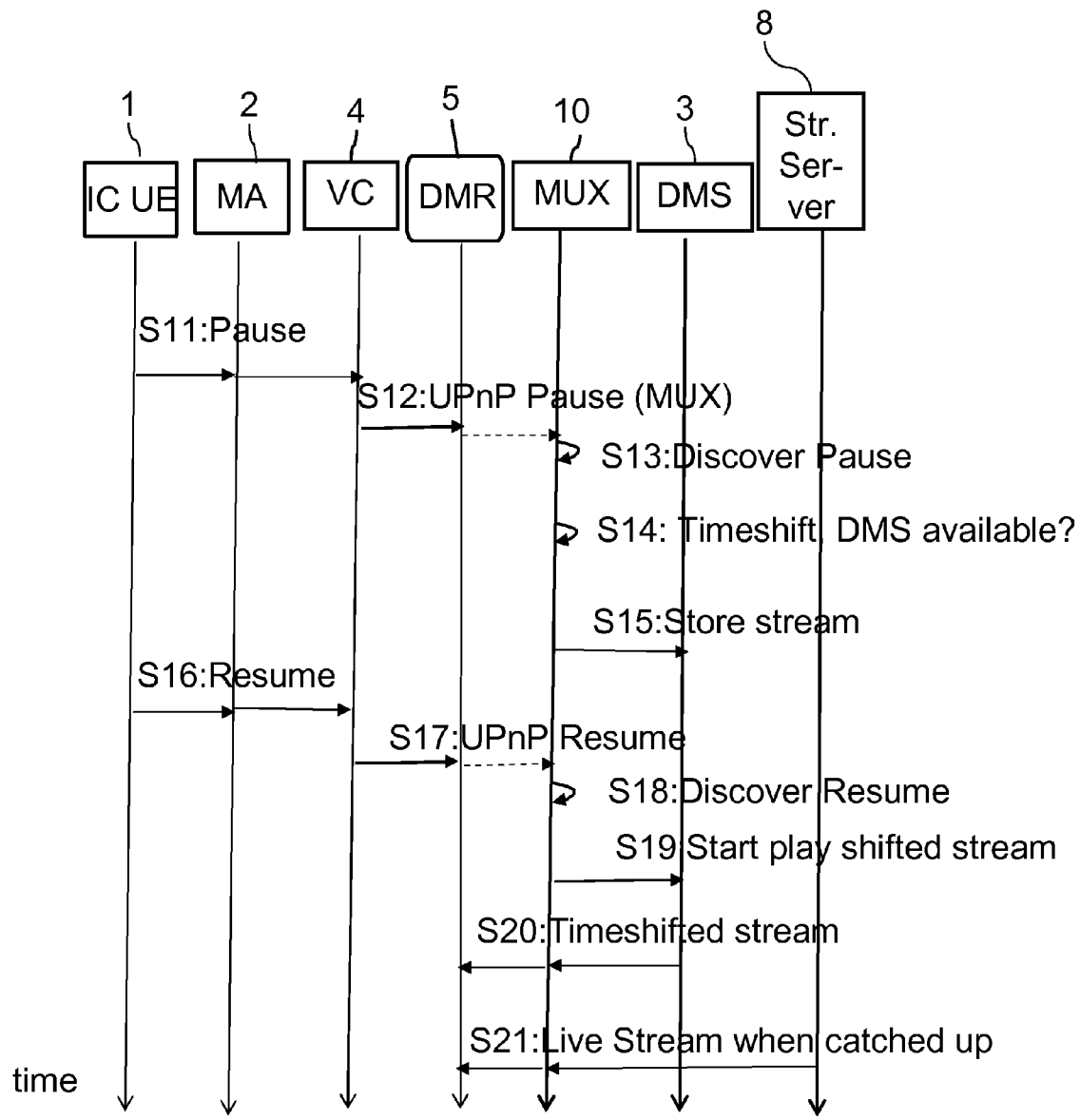
FIG. 4a is an exemplary signalling diagram illustrating time-shifting of a live media stream on a DMR initiated by the Internet-connected UE, the media stream provided by a media muxer node.

FIG. 4a is an exemplary signalling diagram illustrating time-shifting of a live media stream on a DMR, the time-shifting initiated by the Internet-connected UE, and the media stream provided by a media muxer node. In signal S11, the end-user inputs a pause-command on his/her IC UE, which is forwarded to the VC 4, via the MA 2. The VC issues a corresponding UPnP pause command to the DMR, in signal S12, and in signal S13, the MUX discovers a pause in the media streaming to the DMR. In signal S14 the MUX determines if an available DMS for storing the live media stream exists in the DLNA network, and if so, the MUX stores the media stream in the available DMS, in signal S15.

Next, the end-user wants to resume watching the media content, and inputs a resume play-command in his/her IC UE, in signal S16, which is forwarded to the VC 4, via the MA 2. The VC issues a corresponding UPnP Resume command to the DMR, in signal S17, and in signal S18, the MUX discovers that the DMR wants to resume the media streaming. Accordingly, in signal S19, the MUX fetches the time-shifted media stream from the DMS, and provides to the DMR, in signal S20. In case the end-user chooses to speed-up the playing of the time-shifted stream, the time-shifted stream will eventually catch-up the live media stream, and the MUX will continue to provide the live media stream from the streaming server directly to the DMR, in signal S21, instead of storing it in the DMS.

Figure 4B:
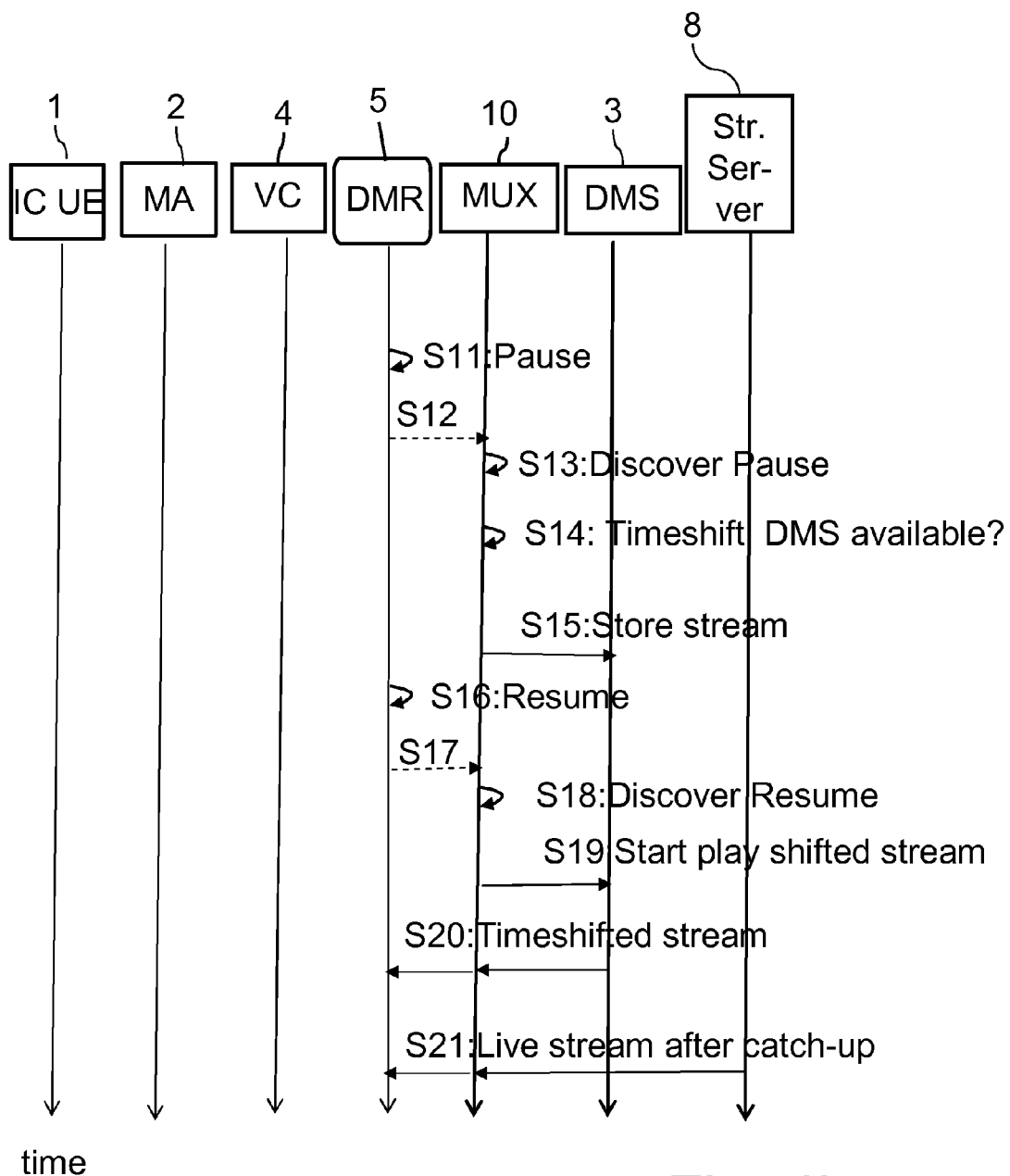
FIG. 4b is an exemplary signalling diagram illustrating time-shifting of a live media stream on a DMR, the time-shifting initiated directly on the DMR, e.g. via a remote-control.

FIG. 4b is an exemplary signalling diagram illustrating time-shifting of a live media stream on a DMR, the time-shifting initiated directly on the DMR, e.g. via a remote-control. In signal S11, the end-user inputs a pause-command on the DMR (e.g. a TV), and the DMR stops the streaming, in signal S12. Accordingly, in signal S13, the MUX discovers a pause in the media stream to the DMR, and determines, in signal S14, if an available DMS for storing the live media stream exists in the DLNA network. If so, the MUX stores the media stream in the available DMS, in signal S15.

Next, the end-user wants to resume watching the media content, and inputs a resume play-command in the DMR, in signal S16, and in signal S18, the MUX discover that the DMR wants to resume the media streaming, in signals S17 and S18. Accordingly, in signal S19, the MUX fetches the time-shifted media stream from the DMS, and provides to the DMR, in signal S20. In case the end-user chooses to speed-up the playing of the time-shifted stream, the time-shifted stream will eventually catch-up the live media stream, and the MUX will continue to provide the live media stream from the streaming server directly to the DMR, in signal S21, instead of storing it in the DMS.

Figure 5:
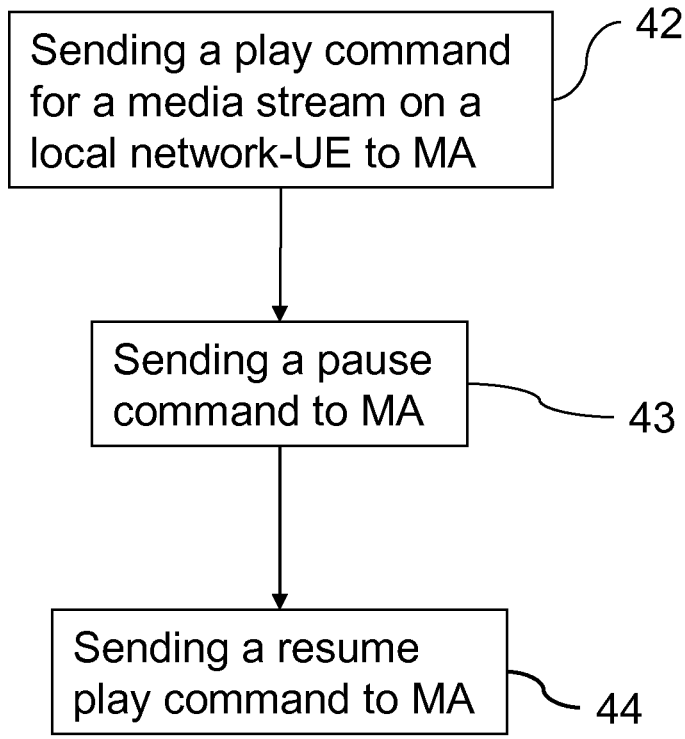
FIG. 5 is a flow diagram showing an external network-connected UE pausing the play-out of a live media stream on a local network-UE, and resuming the play-out of a time-shifted media stream.

FIG. 5 is a flow diagram showing an embodiment of the invention, according to which an external network-connected UE pauses the play-out of a live media stream on a local network-UE, and resumes the play-out of a time-shifted media stream. In step 42, the external network-connected UE sends a play command to the media aggregating node, in step 42, to start playing a selected media content on a selected local network-UE as a live media stream to be received by the local network UE from the media muxer node. In step 43, the external network-connected UE sends a pause command to the media aggregating node, to be forwarded to the local network-UE playing the media stream via the virtual control node, which issues a corresponding local network-adapted command for the local network UE, resulting in that the local network-UE stops the streaming from the media muxer node, and the media muxer node stores the media stream in a local network-storage. At a later moment, in order to resume the media session, the external network-connected UE send a resume play-command to the media aggregating node, in step 44, to be forwarded to the local network-UE via the virtual control node, which issues a corresponding local network-adapted command for the local network UE. This will lead to that the local network-UE resumes the streaming from the media muxer node, the media muxer node now providing the stored time-shifted media stream from the local network storage to the local network UE, instead of the live media stream.

Figure 6:
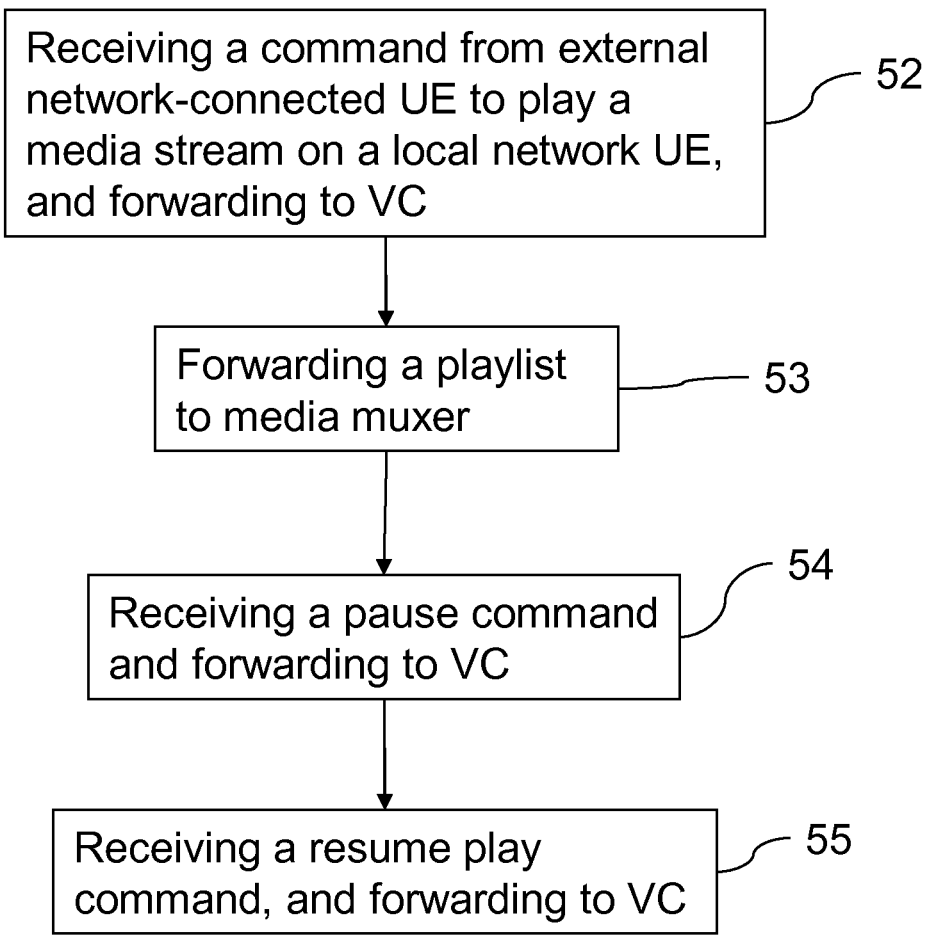
FIG. 6 is a flow diagram showing a media aggregating node pausing the play-out of a live media stream on a local network-UE, and resuming the play-out of time-shifted media stream.

FIG. 6 is a flow diagram showing an embodiment of the invention, according to which a media aggregating node pauses the play-out of a live media stream on a local network-UE, and resumes the play-out of time-shifted media stream. In step 52, the media aggregating node receives a play command from the external network-connected UE, selecting an external network media content and a local network-UE, and forwards the play command to the virtual control node, to play the media content on the local network-UE as a media stream to be received by the local network UE from the media muxer node. In step 53, the media aggregating node forwards a playlist to the media muxer node, enabling the media muxer node to fetch the selected media content from the media streaming server. Next, in step 54, the media aggregating node receives a pause command from the external network-connected UE, to be forwarded to the local network-UE playing the media stream via the virtual control node, which issues a corresponding local network-adapted command for the local network-UE. This will result in that the local network-UE stops the streaming from the media muxer node, and that the media muxer node stores the media stream in a local network-storage. Later, the media aggregating node receives a resume play-command from the external network-connected UE, in step 55, to be forwarded to the local network-UE via the virtual control node, which issues a corresponding local network-adapted command for the local network UE. This will lead to that the local network-UE resumes the streaming from the media muxer node, the media muxer node now providing the stored time-shifted media stream from the local network storage to the local network UE, instead of the live media stream.

Figure 7:
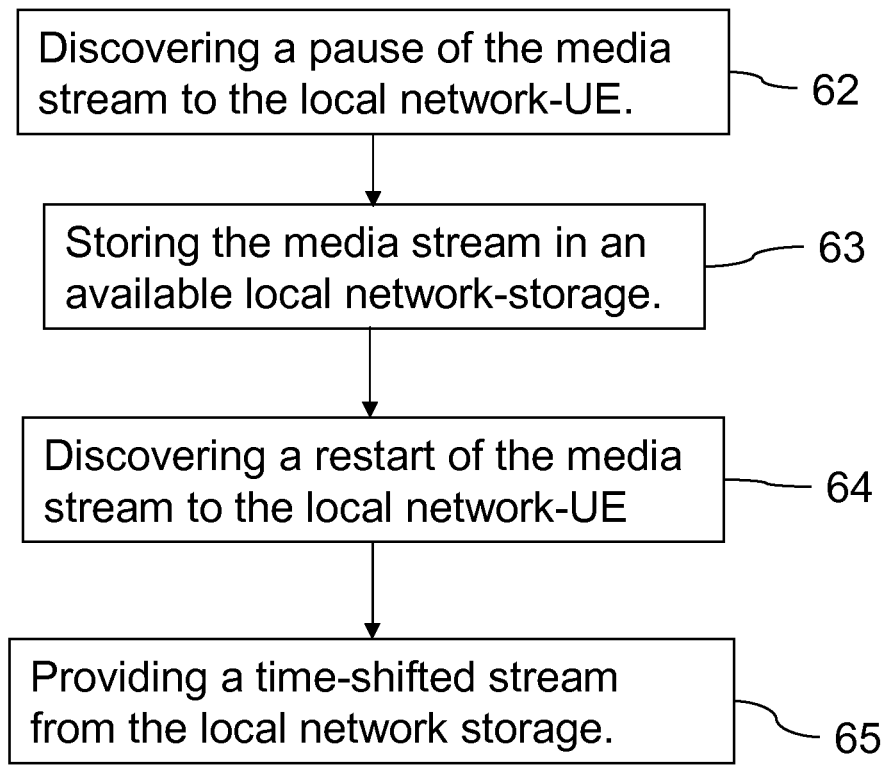
FIG. 7 is a flow diagram showing a media muxer node discovering a pause in the live media stream to a local network-UE, and providing a time-shifted media stream to the local network-UE.

FIG. 7 is a flow diagram showing an embodiment of the invention, according to which a media muxer node discovers a pause in the live media stream to a local network-UE, and provides a time-shifted media stream to the local network-UE. In step 62, the media muxer discovers that the local network-UE has stopped the streaming of the live media stream. The media muxer determines if any available local network-storage exists in the local network, and if so, stores the live media stream in the available storage, in step 63. Later, the media muxer discovers that the local network-storages attempts to resume the streaming, in step 64, and the media muxer provides the time-shifted media stream from the local network-storage, instead of the live media stream, in step 65.

According to a preferred embodiment, the media muxer node has received a playlist from the media aggregating node, retrieved the media content from a media streaming server according to the playlist, and provided the media stream to the local network-UE, before performing the steps according to FIG. 7.

According to alternative exemplary embodiments, the pause and/or the restart of the media stream is initiated directly from the local network UE, instead of from the external network-connected UE. Preferably, the end-user can choose to pause and restart the media stream on his/her external network-connected UE, e.g. an Internet-connected PC or mobile phone, or directly on the local network-UE, e.g. on a DLNA-compatible TV.

According to a further embodiment, the speed of the play-out of the time-shifted media stream is selectable by the end-user, to enable a catch-up of the live media stream, and eventually synchronization with the EPG (Electronic Program Guide.) When the time-shifted media stream becomes synchronized with the live media stream, the media muxer node will provide the live media stream directly to the local network-UE again, instead of storing it in the local network storage, e.g. in a DMS.

According to a preferred embodiment, the local network is a DLNA-network, the local network-UEs are DLNA-compatible, and the external network is the Internet.

Figure 8:
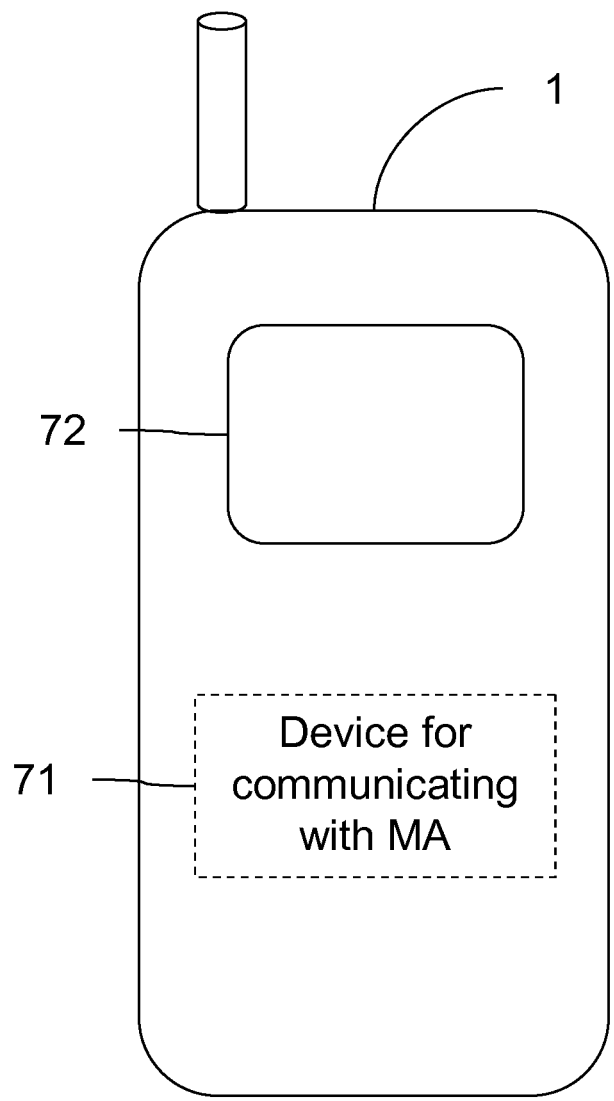
FIG. 8 illustrated schematically an exemplary external-network-connectable UE, according to this invention.

FIG. 8 illustrates schematically an exemplary external-network-connectable UE, according to an embodiment of this invention, e.g. a PC (Personal Computer) or a mobile phone, adapted to communicate with the external network, e.g. the Internet. The UE is provided with a device 71 for communicating with a media aggregating node, as well as with a display 72 for displaying e.g. available external network-media content and available local network-compatible UEs within the local network to a user in order to enable the user to select e.g. media content and an available local network-UE. The UE is further provided with suitable user input means, e.g. keys, (not illustrated in the figure) for initiating the UE to send log-in information and control commands to the media aggregating node, and e.g. to select a speed for the play-out of the time-shifted media stream.

The device 71 for communicating with the media aggregating node comprises a suitable sender and receiver, and the sender is arranged to forward a command to pause a live media stream playing on a local network-UE, as well as a command to resume the playing of a time-shifted media stream after the pause.

According to a preferred exemplary embodiment, the device 71 for communicating with the media aggregating node is further arranged to forward login information from a logged-in user, the user logged in to a virtual control node of a local network, and to send a play command to the media aggregating node to play a user-selected media content on a user-selected local network-UE.

According to another exemplary embodiment, the device 71 is further arranged to forward a command indicating a user-selected speed of the play-out of the time-shifted media stream.

Figure 9:
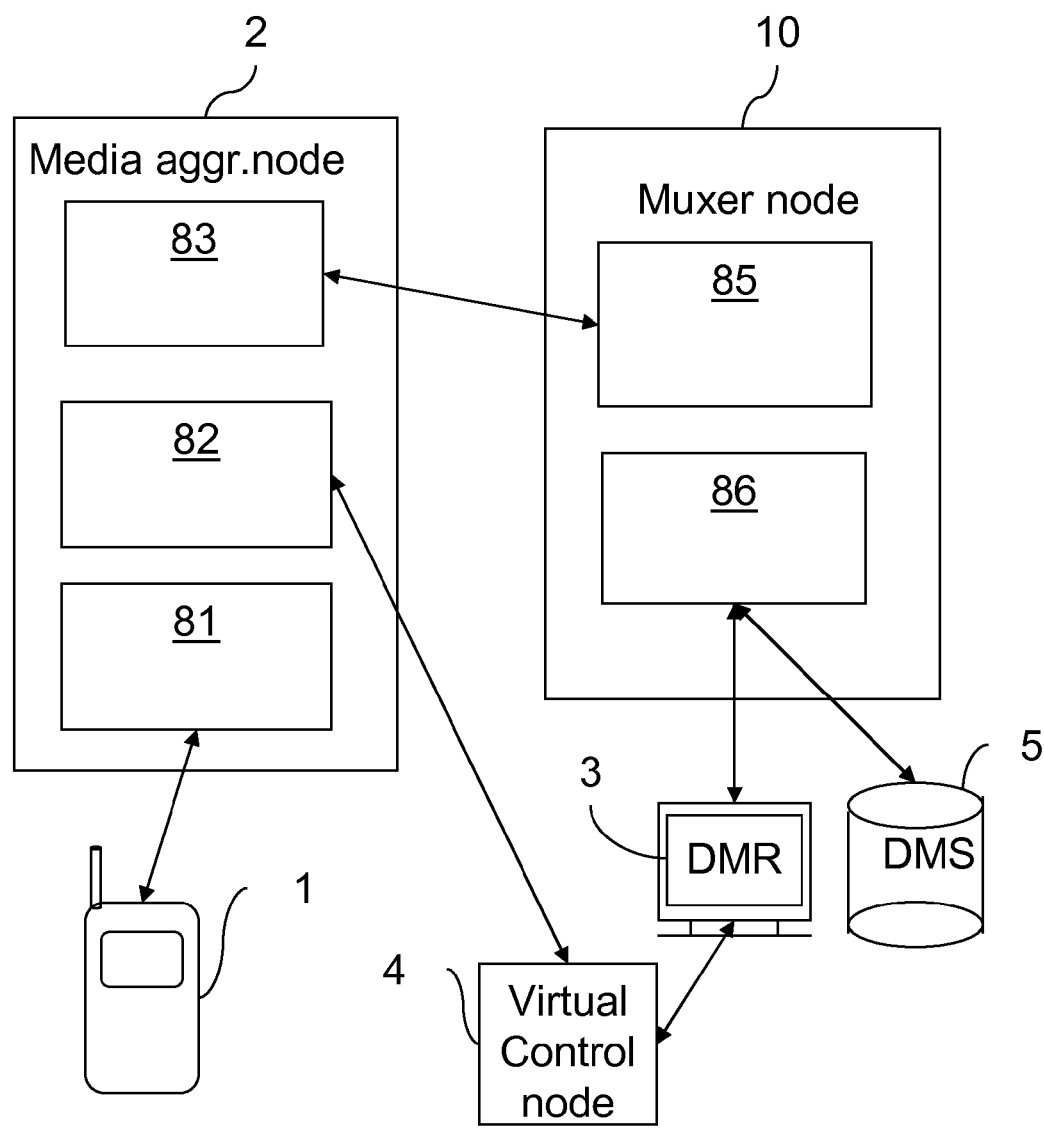
FIG. 9 illustrated schematically an exemplary media aggregating node and an exemplary media muxer node, according to this invention.

FIG. 9 illustrates schematically an exemplary media aggregating node and an exemplary media muxer node, according to an embodiment of this invention.

As described previously, the media aggregating node 2 of a local network is responsible for authenticating the users, for processing all requests and presence messages, for storing data and making the user profile available, and for handling media and device metadata to be displayed on an external-network connected UE. The media aggregating node comprises a device 81 for communicating with an external network-connected UE 1, said device comprising a receiver arranged to receive a command to pause the playing of a live media stream on a local network-UE, as well as a command to resume the playing of a time-shifted media stream after the pause. Preferably, the receiver is also arranged to receive user login information from the user of an external network-connected UE, as well as a command to play a user-selected media content on a user-selected first local network-UE. According to a further exemplary embodiment, the receiver is arranged to receive a message indicating a user-selected speed for the play-out of the time-shifted media stream after the pause.

The media aggregating node is further provided with a device 82 for communicating with one (or more) virtual control nodes 4, said device comprising a sender and a receiver arranged to forward a command to pause the playing of a live media stream on a local network-UE, as well as a command to resume the playing of a time-shifted media stream after the pause. Preferably, the sender is also arranged to forward a command to play a user-selected media content on a user-selected first local network-UE, as a media stream provided by the media muxer node. According to a further exemplary embodiment, the sender is arranged to forward a message indicating a user-selected speed for the play-out of the time-shifted media stream after the pause.

Additionally, the media aggregating node is provided with a device 83 for communicating with a media muxer node, the device preferably arranged to forward a playlist of user-selected media content to the media muxer node.

The media muxer node 10 is arranged to create a media stream by retrieving media content from a media streaming server (not illustrated in FIG. 9), according to a playlist received form the media aggregating node, and to provide the stream to the selected local network UE 5. Thus, the media muxer node is also provided with a device 85 for communicating with the media aggregating node 2, the device comprising a receiver and a sender arranged to receive said playlist of media content.

The media muxer node is further provided with a device 86 for communicating with the local network UEs, the device comprising a sender and a receiver, which is arranged to discover that a local network-UE has paused or resumed the streaming of a media stream provided by the media muxer node. The device is further arranged to determine if any local network storage is available for storing of a media stream, and if so, storing the live media stream in the local network storage, after discovering a pause, and providing the stored media stream to the local network-UE after the pause, as a time-shifted media stream.

According to a further exemplary embodiment, the media muxer node is arranged to provide the live media stream to the local network-UE, instead of the time-shifted media stream from the local network storage, if and when the time-shifted media stream has caught-up the live media stream.

It should be noted that the external network-connectable UE 1, the media aggregating node 2 and the media muxer node 10, as illustrated in FIGS. 8 and 9, may be implemented by physical or logical entities using software functioning in conjunction with a programmed microprocessor or general purpose computer, and/or using an application specific integrated circuit (ASIC).

Further, the above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

DLNA Digital Living Network Alliance
DLNA UE DLNA-compatible User Equipment
DMC Digital Media Controller
DMP Digital Media Player
DMS Digital Media Storage/Server
DMR Digital Media Renderer
UPnP Universal Plug and Play
MA Media Aggregating node
VC Virtual Control node
MUX Media Muxer node
IC UE Internet-connected User Equipment

The invention claimed is:

1. A method for a media aggregating node of time-shifting a live media stream playing on a local-network UE, the playing initiated by an external network-connected UE located outside the local network and communicating with the media aggregating node, the local network further comprising a media muxer node and a virtual control node connected to the media aggregating node, the media muxer node further connected to a media streaming server for providing a media stream to the local-network UE, as well as to a local network-storage wherein a user is logged-in to the external network-connected UE and to the virtual control node, the method comprising the following steps, performed by the media aggregating node:

receiving login information of the user from the virtual control node;
   receiving the login information of the user from the external network-connected UE;
   verifying that the user has logged into the virtual control node based on the login information received from the virtual control node and the login information received from the external network-connected UE;
   receiving a pause command from the external network-connected UE for the live media stream, and forwarding a command to the local-network UE, via the virtual control node, to pause the playing of the live media stream received from the media muxer node, wherein the media muxer node stores the live media stream in an available local network-storage, and wherein the media aggregating node is external to the local network; and
   receiving a resume play command from the external network-connected UE for the live media stream, and forwarding a command to the local network UE, via the virtual control node, to resume the playing of the media stream received from the media muxer node, wherein the media muxer node provides the time-shifted media stream stored in the local network-storage to the local-network UE.

2. The method of claim 1, further comprising:
   receiving a command from the external network-connected UE to play a user-selected live media content on a user-selected local-network UE;
   sending a command to the virtual control node of the local network to play the media content on the local-network UE as a live media stream received from the media muxer node; and
   sending a playlist to the media muxer node.

3. The method of claim 1, wherein the time-shifted media stream is played at a user-selectable speed.

4. A media aggregating node arranged to time-shift a media stream playing on a local-network UE, the playing initiated by an external network-connected UE located outside the local network and communicating with the media aggregating node, a media muxer node of the local network connectable to a media streaming server for providing a media stream to the local-network UE, as well as to a local network-storage, and wherein a user is logged-in to the external network-connected UE and to a virtual control node of the local network, the media muxer node and the virtual control node both connectable to the media aggregating node, the media aggregating node comprising:

a first device for communicating with the external network-connected UE, wherein the first device is arranged to:
      receive login information of the user from the virtual control node;
      receive the login information of the user from the external network-connected UE;
      receive a command to pause the playing of the live media stream;
      receive a command to resume the playing of the live media stream;
   a second device for communicating with the virtual control node, wherein the second device is arranged to:
      verify that the user has logged into the virtual control node based on the login information received from the virtual control node and the login information received from the external network-connected UE;
      forward a command to pause the playing of the media stream from the media muxer on the local-network UE, wherein the media muxer stores the media stream in an available local network-storage, and wherein the media aggregating node is external to the local network;
      forward a command to resume the playing of the media stream from the media muxer on the local-network UE, wherein the media muxer provides the time-shifted media stream stored in the local network-storage.

5. The media aggregating node of claim 4, wherein the device for communicating with the external network-connected UE is further arranged to:
   receive a command to play user-selected live media content on a user-selected local network UE; and
   wherein the device for communicating with the virtual control node is further arranged to:
      send a command to play the live media content on the local-network UE as a live media stream to be received by the local-network UE from the media muxer node; and wherein a device for communicating with the media muxer node is arranged to forward a playlist.

6. The media aggregating node of claim 4, further arranged to receive a message from the external network-connected UE indicating a user-selected speed for the playing of the time-shifted media stream, to be forwarded to the virtual control node.

7. The method of claim 1, wherein the media aggregating node communicates with the virtual control node via a home gateway node.

* * * * *